United States Patent
Kleinsorgen et al.

[11] Patent Number: 6,110,433
[45] Date of Patent: Aug. 29, 2000

[54] PROCESS FOR THE RECOVERY OF METALS FROM USED NICKEL/METAL/ RARE EARTH HYDRIDE STORAGE BATTERIES

[75] Inventors: Klaus Kleinsorgen; Uwe Köhler, both of Kelkheim, Germany; Alexander Bouvier, Krumpendorf; Andreas Fölzer, Treibach-Althofen, both of Austria

[73] Assignee: Varta Batterie Aktiengesellschaft, Hannover, Germany

[21] Appl. No.: 08/876,345

[22] Filed: Jun. 16, 1997

Related U.S. Application Data

[63] Continuation of application No. PCT/EP95/04736, Dec. 1, 1995.

[30] Foreign Application Priority Data

Dec. 20, 1994 [DE] Germany .............................. 44 45 495

[51] Int. Cl.⁷ .......................... C01F 17/00; B01D 11/00; C01G 49/00; C22B 59/00
[52] U.S. Cl. .................... 423/21.1; 423/21.5; 423/150.1; 423/49; 423/109; 423/132; 423/140; 423/127; 423/128; 423/146; 423/99; 423/139
[58] Field of Search ............................. 423/21.1, 150.1, 423/49, 99, 109, 132, 127, 128, 140, 146, 139, 21.5; 241/24.1

[56] References Cited

U.S. PATENT DOCUMENTS

| | | | |
|---|---|---|---|
| 4,041,125 | 8/1977 | Alstad et al. | 423/21.5 |
| 4,162,296 | 7/1979 | Muller et al. | 423/139 |
| 5,129,945 | 7/1992 | Lyman et al. | 423/263 |
| 5,180,563 | 1/1993 | Lai et al. | 423/21.1 |
| 5,377,920 | 1/1995 | Alavi et al. | 241/17 |
| 5,407,463 | 4/1995 | Van Erkel | 423/140 |
| 5,429,887 | 7/1995 | Lyman et al. | 423/21.1 |
| 5,478,664 | 12/1995 | Kaneko et al. | 429/49 |
| 5,728,355 | 3/1998 | Asada | 423/21.1 |

FOREIGN PATENT DOCUMENTS

| | | | |
|---|---|---|---|
| 262845 | 12/1988 | Germany | 423/21.1 |
| 294681 | 10/1991 | Germany | 423/21.1 |
| 59-67326 | 4/1984 | Japan | 423/21.1 |
| 61-251514 | 11/1986 | Japan | 423/21.1 |

*Primary Examiner*—Steven Bos
*Attorney, Agent, or Firm*—Schnader Harrison Segal & Lewis LLP

[57] ABSTRACT

The invention relates to a process for recovering metals from used nickel/hydride storage batteries, in which storage battery scrap has been mechanically comminuted and divided into at least a coarse fraction and a fine fraction capable of being treated separately from one another. The process comprises the steps of digesting and dissolving the fine fraction with a mixture of sulfuric acid and hydrogen peroxide, performing a double sulfate precipitation of the rare earths by raising the pH, performing a precipitation of the iron and of the aluminum by further raising the pH, performing a solvent extraction of other metals to separate nickel and cobalt which remain in the aqueous phase from the other metals which are extracted into the organic phase. Optionally, the nickel and the cobalt can be separated from each other and, if desired, the mixed-metal rare earth component which has been recovered can be melted together with cobalt and nickel alloy for the fabrication of new batteries.

15 Claims, No Drawings

PROCESS FOR THE RECOVERY OF METALS FROM USED NICKEL/METAL/ RARE EARTH HYDRIDE STORAGE BATTERIES

This application is a continuation of PCT/EP95/04736 filed Dec. 1, 1995.

BACKGROUND OF THE INVENTION

1. Field of the Invention

The invention relates to a process for the recovery of metals from used nickel/metal hydride storage batteries in which the material is mechanically comminuted and is divided up into at least a coarse fraction and a fine fraction which are treated separately from one another, the fine fraction being dissolved by means of a strong acid, from which solution the metals are separated stepwise by selective precipitation and/or liquid/liquid extraction and recovered.

2. Description of the Related Art

Nickel/metal hydride (NiMeH) storage batteries are regarded as a future alternative in the field of rechargeable cells and have already gained substantial market shares in recent years. High energy data per unit volume and per unit weight make batteries of this type an energy storage system which is interesting for all applications, be it as appliance battery or as traction battery for electric vehicles.

A disadvantage of this high-performance system is, however, that it requires the use of expensive raw materials, which are scarce when measured against the available resources. The most important components used in the NiMeH storage batteries at present are nickel, rare earths and, in particular cobalt, which is regarded as a strategically important raw material and is therefore also subject to large price fluctuations. Nickel and cobalt are the essential elements in the positive electrode. In addition to nickel and cobalt, rare earths, in particular, are constituents of the hydrogen storage alloy in the negative electrode. The present process relates essentially to NiMeH storage batteries with this alloy composition.

In addition to the active electrode materials, which serve directly for the storage of energy, the storage batteries also contain support materials composed of nickel as important material components.

In view of the high material value which a nickel/hydride cell therefore represents even in the no longer serviceable state, and of the scarce resources for these materials mentioned, their recycling is an urgent economic requirement.

The recycling of nickel/metal hydride storage batteries is expected to depend on recycling methods which are already known from the recovery of nickel and cadmium from Ni/Cd storage batteries, for example in accordance with PCT Publication No. WO 92/03853, or from the treatment of a scrap material containing rare earths (in accordance with U.S. Pat. No. 5,129,945).

A process described in German Patent Specification 42 24 884 has the object of recycling used batteries and storage batteries from domestic refuse. Since these accumulate in an unsorted manner and, among the valuable substances, mercury and copper from primary cells, which do not occur in alkaline storage batteries, also have to be considered, this process is complicated and the equipment correspondingly expensive. The initial steps in the development of the scrap material are, however, similar in all cases: the used cells are first mechanically comminuted and separated into various fractions by screening, air classification and magnetic separation. A magnetic fraction essentially comprising the casing scrap contains nickel and iron and can be processed to produce ferronickel. Plastics from the casings, separators and binders accumulate in a light fraction. Finally, a fine fraction is composed of the comminuted actual contents of the cells, the electrode material and electrolyte material. This fraction contains the mass of the substances to be recovered. They are separated stepwise by a wet-chemical treatment, starting with an acid digestion, and generally recovered in elemental form as metal.

The Ni/Cd storage batteries are distinguished from the alkaline nickel/metal hydride storage batteries in principle only by the negative electrode, whose active mass is composed of a hydrogen-storage alloy on a support.

Hydrogen-storage alloys are intermetallic compounds which can be assigned to an $AB_5$ type by analogy with the simple binary alloy $LaNi_5$ or to an $AB_2$ type by analogy with the alloy $TiNi_2$. Hydrogen-storage alloys of the $AB_5$ type for nickel/metal hydride storage batteries are frequently composed of 45–55% Ni, 30–35% rare earths (RE), 5–15% Co, 2–5% Mn and 1.4% Al.

In the reprocessing of nickel/metal hydride storage batteries containing $AB_5$ alloys, an acid digestion by known methods of the fine fraction originating from the mechanical comminution has proved inadequate because it is precisely some of the particularly valuable raw materials, namely the REs, the Ni and the Co, which fail to dissolve. A specific teaching for the complete inclusion, in particular, of the REs is also not to be found in European Patent EP-A-585 701, which relates to a method for the waste disposal of nickel/cadmium or nickel/hydride cells since it does not deal with the type of metal hydride which may be present or its selection.

SUMMARY OF THE INVENTION

The object of the invention is to treat the fine fraction produced in the mechanical coarse processing of used nickel/metal hydride storage batteries, which fine fraction is essentially composed of the active electrode masses, their support material and the electrolytes, in such a way as to ensure a dissolution without residue of the finely divided scrap.

DETAILED DESCRIPTION

The processing of the cells is accordingly introduced by a series of steps which are modifications of measures known per se.

Thus, it has proved expedient to sort the scrap supplied initially in accordance with cell size, i.e. to divide it up into small round cells and button cells and large prism-shaped cells. Both cell groups are opened under water, a separation of the casing parts from the casing content being achieved relatively simply in the case of the large cells by sawing up the cell container. Whereas the casing parts return to the steel industry as steel scrap, the electrode assemblies are comminuted under water to form pieces 3 to 15 mm in size, filtered and washed until liquor-free. The small cells are opened by comminuting them to particles of the same size from 3 to 15 mm, likewise washing them until liquor-free and removing iron particles by means of magnetic separators.

A shredder system is suitable for all the comminution processes. Carrying out the comminution under water is recommended because the fine particles of the negative electrode can ignite.

The largely Fe-free particles of the round cells and button cells and the electrode particles from the prism-shaped cells are now combined and dissolved, according to the invention, in an approximately 20%-strength sulphuric acid with a hydrogen peroxide addition of 1% by weight to 10% by weight. The $H_2O_2$ content of the sulphuric acid should preferably be approximately 3% by weight.

This composition of the digesting agent ensures that the metallic and oxidic constituents of the electrodes are completely dissolved.

A still unused typical nickel/metal hydride cell contains: Ni $(OH)_2$ (positive mass), Ni (met) (negative storage alloy, support), CoO (positive mass), Co(met) (negative storage alloy), Zn $(OH)_2$ (positive mass), rare earth (mixed metal) (negative storage alloy), Mn (negative storage alloy), Al (negative storage alloy), Fe (support, cell container).

In addition, small amounts of carbon additives (negative electrode), PTFE binder (negative, positive electrode) and polymeric fibrous nonwoven material (separator) are present.

This results in a percentage distribution of the metals as-follows:
Ni approximately 45%, Co approximately 5%, REs (mixed metal) approximately 10%, Fe approximately 35% and small amounts of Zn, Mn and Al.

During the operation of the cell over several hundred charge/discharge cycles, however, the interior of the cell undergoes a chemical alteration. This relates, in particular, to the hydrogen-storage alloy used in the negative electrode, whose components are exposed to a creeping oxidation. In addition, the positive electrode also undergoes an alteration which has to be taken into account in choosing the recycling process. Thus, some of the Ni$(OH)_2$ will remain permanently in the oxidized 3-valent state. This is of importance for the procedure according to the invention insofar as nickel oxide of this valency level can be digested by acid only with great difficulty. As a result of the digestion mixture according to the invention being composed of sulphuric acid and hydrogen peroxide, the said difficulties are overcome and the metallic and oxidic constituents of the electrode are dissolved completely. The $H_2O_2$ addition specifically ensures that 3-valent nickel oxide, 4-valent cerium oxide and also 4-valent manganese oxide which are also otherwise insoluble and which are still present in the electrodes are dissolved in the acid in a reducing manner. Passive layers are also avoided in this way during the dissolution of the metal.

Since the support materials are also composed of metal, only the carbon-containing components of the electrodes and the PTFE used as binder are left behind. These are deposited, together with the residual separator material of the cell stack or winding, on the surface of the solution reactor and can easily be skimmed off by means of a flotation process.

A particularly advantageous property of the digestion mixture in accordance with the invention is that it only partially dissolves the hydrogen-storage alloys of the $AB_2$ type used in some nickel/metal hydride cells. The possible component of the latter in the cell scrap can therefore be largely separated off even during this step.

After conclusion of the solution process, the reactor contains a solution of valuable substances having a total metal-ion concentration of approximately 50 to 80 g/l. Contained in this solution are all the REs, all the Co, Ni, Mn, Zn and Al without residue from the scrap supplied for processing. Fe also present enters the solution of valuable substances because of an incomplete preliminary separation of the Fe-containing parts. Depending on the quality level of the preliminary separation, its amount is to be estimated at up to 3 g/l.

Finally, Cd concentrations of between 0.1 to 4 g/l must also be expected for the case where Ni/Cd cells seep in as a result of incorrect sorting, and furthermore, contamination by Ti, Zr, Cr and V must be expected from $AB_2$ alloys. The proportion of Mn and Zn is possibly increased as a result of adding alkali/manganese primary cells.

After the solution process is concluded, the pH of the solution of valuable substances is initially in the extremely acid range (pH<<1).

The rare earths are precipitated as very sparingly soluble double salts of the $(RE)_2(SO_4)_3 \cdot Na_2SO_4 \cdot xH_2O$ type from the strongly acidic solution by adding NaOH or $NR_4OH$, in which process the pH rises from approximately 1.5 to 2. RE is representative of La, Nd, Dy, Pr, Sm, Ce etc. or of mixtures of the same.

The precipitate filtered off is dissolved in acid, and from this solution, a rare earth chloride or a rare earth oxide is obtained which is subjected to an electrometallurgical reduction to the rare earth metal or to a mixture of a plurality of the same (mixed metal).

In order to ensure that no iron is coprecipitated in the pH range favourable for the double sulphate precipitation, it has proved very effective, according to the invention, to circulate the fresh solution of the fine fraction after the $H_2SO_4/H_2O_2$ digestion beforehand over the metal produced in the coarse fraction until all the iron dissolved by the $H_2O_2$ as $Fe^{3+}$ is reduced to $Fe^{2+}$ and all the $H_2O_2$ has been decomposed.

The filtrate from the double sulphate precipitation now contains all the transition metals not belonging to the rare-earth group and aluminium, and possibly small residues of rare earths, and furthermore of Ti, Zr, Cr and V.

Further raising the pH beyond 2, preferably to 4 to 4.5, next precipitates iron in the form of a basic sulphate (NaFe$_3$(SO$_4$)$_2$(OH)$_6$, jarosite) or of hydroxide, and possibly aluminium as Al$(OH)_3$. So that all the $Fe^{2+}$ enters the precipitate in precipitable 3-valent form, the solution is treated beforehand with an oxidizing agent, preferably $H_2O_2$.

A readily filtrable Fe and Al precipitate with particularly sharp separation is formed if, according to the invention, it is not alkali hydroxide solution, but alkali carbonate, optionally a mixture of NaOH and $Na_2CO_3$, which is used for this precipitation to be carried out above pH 2. The latter should contain at least 10% by weight of $Na_2CO_3$. Under these circumstances, even extremely small amounts of Fe, which would otherwise have to be entrained in the filtrate and separated again in the further course of the processing, are withheld from the solution of valuable substances.

Presumably, there is associated with the introduction of the alkali carbonate, during the course of which the acidic solution foams as a result of the release of $CO_2$, a vigorous stirring effect which ensures that the precipitation conditions are the same everywhere in the solution. If the stirring effect is absent, a strongly alkaline environment instantaneously prevails preferentially only at the dropping-in point of the alkali hydroxide solution, while the surroundings are still strongly acidic. In the region of the influence of the latter, the hydroxide precipitate then partially dissolves again.

The step following the Fe and Al precipitation, in which Ti, Zr and V contaminants are possibly included, is an extraction stage as is known per se from processes for producing nickel and cobalt and which serves to select certain metals from the digestion solution. Suitable as extractants are preferably phosphorus-containing cationic exchangers in combination with an organic solvent.

The quantitative recovery of nickel and cobalt is of particular interest for the production of new hydrogen-storage alloys, and also for the production of new nickel hydroxide masses for the positive electrode of nickel/metal hydride cells. Within the scope of the invention, it is therefore particularly advantageous to conduct the solvent extraction in such a way that it brings about a complete separation of the valuable substances Ni and Co, on the one hand, and of the other accompanying substances, on the other hand, namely Zn, Mn, Cd, Al and rare earths, Fe and possibly Cr, insofar as these have not been completely removed by the precipitations which have already taken place beforehand.

This separation is successful if the pH of the solution of valuable substances after the Fe and Al hydroxide precipitation is adjusted to values of pH 3 to pH 4, preferably to approximately pH 3.5, by adding alkali and bringing the solution into intimate contact with a liquid mixture composed of diethylhexylphosphoric acid, isotridecanol and an aliphatic hydrocarbon as diluent by stirring in the mixer. The proportion by volume of the three liquids should be, in accordance with the stated sequence, 30:10:60. Furthermore, the aqueous phase and the solvent phase should be in a ratio by volume of 1:1 or greater.

As a result of the solvent extraction, Zn, Mn, Cd, Al, Fe and rare earths are transferred completely to the organic phase, while Ni and Co remain behind quantitatively in the aqueous phase. Consequently, their concentrations in the solution of valuable substances is in the same ratio with which they are involved in the storage battery scrap.

The solvent extraction carried out under the conditions mentioned is a "purification extraction" in relation to the metals Ni and Co, which purification extraction eliminates the influence of the incorrect sortings. They can now be separated from one another and from the weakly acidic aqueous extraction phase by repeated application of a solvent extraction process and, for example, precipitated as hydroxides by addition of sodium hydroxide or sodium carbonate and, finally, so melted in elemental form from the latter by metallothermic processes.

The metal salt which has entered the organic phase can be transferred to the aqueous acidic phase by so-called stripping prior to the hydroxide precipitation.

A particularly beneficial method of recovering Ni and Co is that of electrochemical deposition because existing electrolysis devices can be utilized therefor. In this connection, a common electrolysis of Ni and Co can be carried out with great advantage directly from the aqueous phase after the purification extraction since the deposited product is an Ni/Co alloy with the same atomic ratio as the ratio of the solvent concentrations of the metals, their ratio again corresponding to the distribution of Ni and Co in the processed storage battery scrap. The separate production of Ni and Co by electrolysis is again indicated if they are to be made available as material for the positive nickel hydroxide electrode.

The recycling process according to the invention consequently results in the production of a final product which can be supplied directly to the alloy producer as master alloy for new hydrogen-storage alloys.

The mixed-metal component of the new hydrogen-storage alloy is recovered from the double-sulphate precipitate of the rare earths by dissolving the latter in acid. A rare earth chloride or rare earth oxide is obtained from the latter solution and is subjected to an electrometallurgical reduction to the rare earth metal or to a mixture of a plurality of the same (mixed metal).

The Ni/Co master alloy smelted in the arc furnace can now be remelted, together with the mixed metal processed from the double sulphate precipitation, in a vacuum induction crucible furnace or in a vacuum arc furnace to produce hydrogen storage alloy.

Since the positive electrodes of nickel/metal hydride storage batteries also contain Ni and Co in a similar atomic ratio to the hydrogen-storage alloy of the negative electrode, the Ni/Co alloy produced by simultaneous electrolysis can also be accepted directly by the battery producer for producing new positive nickel hydroxide masses after optional separation.

Because of the similarity of the positive electrodes used in nickel/metal hydride cells and in Ni/Cd cells, the proportionate ratio of nickel and cobalt in used nickel/metal hydride cells is only insignificantly altered by entrainment of Ni/Cd cells in the storage battery scrap. The recycling process according to the application is consequently substantially insensitive to incorrect sortings.

What is claimed is:

1. A process for recovering metals from used nickel hydride storage batteries, the batteries having nickel, rare earths and metals, cobalt, iron, manganese, zinc, cadmium, and aluminum, in which storage battery scrap has been mechanically comminuted and divided up into at least a coarse fraction and a fine fraction capable of being treated separately from one another, comprising the steps of:
   (a) digesting and dissolving the fine fraction in a strong acid mixture comprising sulphuric acid and hydrogen peroxide to generate a sulphuric acid digest having a pH less than 1,
   (b) performing a double sulphate precipitation of rare earths and metals by raising the pH of the sulphuric acid digest from about 1.5 to 2.0 by stepwise addition of an alkali to the sulphuric acid digest, thereby precipitating the rare earths as double sulphate salts,
   (c) separating a rare earth sulfate salt precipitate from the digest, thereby obtaining a filtrate,
   (d) precipitating iron and aluminums by raising the pH of the filtrate above 2.0,
   (e) raising the pH of the filtrate from step (d) to a range of 3.0 to 4.0 by addition of an alkali, adding a solvent extractant to said filtrate raised to pH 3.0 to 4.0 thereby separating the nickel and the cobalt which remain quantitatively in an aqueous phase in said filtrate raised to pH 3.0 to 4.0 from the metals Zn, Mn, Cd, Al, Fe and rare earths remaining following the precipitations of steps (b) and (d) which are extracted into the organic phase, the nickel and cobalt remaining in the aqueous phase in the same atomic ratio in which they were present in the storage battery scrap.

2. The process of claim 1, wherein the $H_2O_2$ concentration in the sulphuric acid is 1% by weight to 10% by weight.

3. The process of claim 2, wherein the $H_2O_2$ content of the sulphuric acid is approximately 3% by weight.

4. The process of claim 3, wherein the sulphuric acid is approximately 20% strength.

5. The process of claim 2, wherein the sulphuric acid is approximately 20% strength.

6. The process of claim 1, wherein after step (a) the digest is circulated over the coarse fraction until substantially all the hydrogen peroxide is decomposed and iron dissolved as $Fe^{3+}$ is reduced to $Fe^{2+}$.

7. The process of claim 1, wherein the digest is circulated over the coarse fraction until substantially all the hydrogen peroxide is decomposed and iron dissolved as $Fe^{3+}$ is reduced to $Fe^{2+}$.

8. The process of claim 1, wherein the solvent extraction comprises a mixture of diethylhexylphosphoric acid (DEHPA) with isotridecanol and aliphatic hydrocarbon in a ratio of 30:10:60.

9. The process of claim 1 wherein before raising the pH of the solution in step (d), the solution is treated with an oxidizing agent, thereby oxidizing $Fe^{2+}$ to $Fe^{2+}$ to facilitate its precipitation from the solution.

10. The process of claim 9 wherein the oxidizing agent is $H_2O_2$.

11. The process of claim 1 wherein step (d), the pH of the solution is raised to within the range of 4 to 4.5.

12. The process of claim 1 wherein after step (e), the nickel and cobalt are separated from each other, and at least one of them is collected.

13. The process of claim 1 wherein after step (b) a mixed-metal rare earth component is recovered from the double sulphate precipitate of the rare earth as reduced rare earth metal or a mixture thereof.

14. The process of claim 1 wherein step (d) the pH of the solution is raised by addition of an alkali carbonate or an $NaOH/Na_2CO_3$ mixture containing at least 10% by weight of $Na_2CO_3$.

15. The process of claim 1 wherein step (d), aluminum is precipitated out of he solution aluminum hydroxide.

* * * * *